(12) United States Patent
Ishikawa

(10) Patent No.: US 9,885,946 B2
(45) Date of Patent: Feb. 6, 2018

(54) PROJECTION TYPE DISPLAY APPARATUS AND IMAGE DISPLAY METHOD

(71) Applicant: NEC Display Solutions, Ltd., Tokyo (JP)

(72) Inventor: Takashi Ishikawa, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 15/115,883

(22) PCT Filed: Mar. 5, 2014

(86) PCT No.: PCT/JP2014/055650
§ 371 (c)(1),
(2) Date: Aug. 1, 2016

(87) PCT Pub. No.: WO2015/132906
PCT Pub. Date: Sep. 11, 2015

(65) Prior Publication Data
US 2017/0010524 A1    Jan. 12, 2017

(51) Int. Cl.
*G03B 21/28* (2006.01)
*G03B 21/00* (2006.01)
(Continued)

(52) U.S. Cl.
CPC ....... *G03B 21/2073* (2013.01); *G03B 21/008* (2013.01); *G03B 21/2066* (2013.01);
(Continued)

(58) Field of Classification Search
CPC .. G03B 21/28; G03B 21/008; G03B 21/2073; G03B 21/2066; G03B 33/12; H04N 9/3111; H04N 9/3114; H04N 9/3105
(Continued)

(56) References Cited

U.S. PATENT DOCUMENTS 6,942,345 B2    9/2005   Okuyama et al.
2003/0098955 A1  5/2003   Okuyama et al.

FOREIGN PATENT DOCUMENTS

CN    1421725 A    6/2003
CN    1740848 A    3/2006
(Continued)

OTHER PUBLICATIONS

Ariga, Susumu; JP 2000-330072 A; Nov. 30, 2000; Machine translation in English.*
(Continued)

*Primary Examiner* — Ryan Howard
(74) *Attorney, Agent, or Firm* — McGinn IP Law Group, PLLC

(57) ABSTRACT

A projection type display apparatus includes illumination unit that emits a plurality of color lights having a predetermined polarization direction, a plurality of optical path adjustment units that totally reflect the plurality of color lights, respectively, a plurality of optical modulation units that modulates the plurality of color lights totally reflected by the plurality of optical path adjustment units, respectively, to emit a plurality of modulated color lights, a synthesis unit that emits the plurality of modulated color lights emitted from the optical modulation units in a same direction, and a correction unit that is arranged on an optical path between the illumination unit and the synthesis unit and that changes a polarization state of light that entered the correction unit to covert light incident on the synthesis unit into linearly polarized light.

13 Claims, 15 Drawing Sheets

(51) Int. Cl.
  *H04N 9/31* (2006.01)
  *G03B 21/20* (2006.01)
  *G03B 33/12* (2006.01)
(52) U.S. Cl.
  CPC .............. *G03B 33/12* (2013.01); *G03B 21/28* (2013.01); *H04N 9/3105* (2013.01)
(58) Field of Classification Search
  USPC ..................................... 353/81, 82; 359/833
  See application file for complete search history.

(56) References Cited

FOREIGN PATENT DOCUMENTS

| | | |
|---|---|---|
| CN | 1912678 A | 2/2007 |
| CN | 103389612 A | 11/2013 |
| JP | 2000-330072 A | 11/2000 |
| JP | 2003-195221 A | 7/2003 |
| JP | 2004-102105 A | 4/2004 |
| JP | 2004-126496 A | 4/2004 |
| JP | 2006-030421 A | 2/2006 |
| JP | 2011-248213 A | 12/2011 |

OTHER PUBLICATIONS

International Search Report (ISR) (PCT Form PCT/ISA/210), in PCT/JP2014/055650, dated Jun. 3, 2014.
Chinese Office Action dated Jun. 2, 2017, with an English translation thereof.

\* cited by examiner

Light

PROJECTION TYPE DISPLAY APPARATUS AND IMAGE DISPLAY METHOD

TECHNICAL FIELD

The present invention relates to a projection type display apparatus and an image display method.

BACKGROUND ART

In recent years, there has been proposed a display apparatus that uses a plurality of display elements such as DMD (Digital Micromirror Device). The display apparatus, that uses the plurality of display elements, includes an optical synthesis optical system that is configured in which a plurality of projection lights emitted from the respective display elements are synthesized on the same optical axis, and projects the synthesized projection light. For example, Patent Literature 1 discloses a display apparatus that includes three DMDs as display elements, and a cross dichroic prism (hereinafter, referred to as XDP) as an optical synthesis optical system.

FIG. 1 is a diagram illustrating the configuration of the display apparatus described in Patent Literature 1. Display apparatus 1000 illustrated in FIG. 1 includes illumination optical system 100, light separation XDP 210, dichroic mirror 220, reflection mirrors 230 and 240, condenser lenses 250 and 260, three DMDs 300R, 300G, and 300B, three TIR (Total Internal Reflection) prisms 400R, 400G, and 400B, optical synthesis XDP 500, and projection lens 600.

A light exited from illumination optical system 100 is separated into a red light and the mixed light of green and blue at light separation XDP 210. The red light enters TI prism 400R via reflection mirror 240 and condenser lens 260. The mixed light of green and blue enters dichroic mirror 220 via reflection mirror 230 and condenser lens 250. At dichroic mirror 220, the mixed light of green and blue is separated into a green light and a blue light. The green light enters TIR prism 400G, and the blue light enters TIR prism 400B.

The lights respectively made incident on TIR prisms 400R, 400G, and 400B are totally reflected respectively on first surfaces 402R, 402G, and 402B, and respectively enter DMDs 300R, 300G, and 300B that each correspond to TIR prisms 400R, 400G, and 400B.

Each of DMDs 300R, 300G and 300B has a plurality of micromirrors arranged in a matrix in the image forming region and, by rotating each micromirror to change the reflection direction of light, modulates the incident light to emit the modulated light as image light. The image lights respectively emitted from DMDs 300R, 300G, and 300B are transmitted through TIR prisms 400R, 400G, and 400B that each correspond to DMDs 300R, 300G, and 300B to enter XDP 500.

XDP 500 has second surfaces 506 and 508 for transmitting or reflecting the incident image lights of respective colors, and emits a plurality of image lights incident on second surfaces 506 and 508 in the same direction to synthesize the image lights of respective colors. The synthesized image light is emitted from XDP 500 toward projection lens 600, and is then projected to a screen (not illustrated) via projection lens 600.

In XDP 500, S-polarized light or P-polarized light is reflected by second surfaces 506 and 508 while the other is transmitted through second surfaces 506 and 508. Thus, in order to efficiently synthesize the lights respectively emitted from DMDs 300R, 300G and 300B, the lights incident on second surfaces 506 and 508 are converted into S-polarized lights or P-polarized lights.

Further, DMDs 300R, 300G, and 300B are arranged such that the long side of the image forming region may be inclined by 45° to the side of the light incident surface of XDP 500. Therefore, display apparatus 1000 must be inclined by 45° from a horizontal direction to normally display a projected image.

CITATION LIST

Patent Literature

Patent Literature 1: JP2000-330072A

DISCLOSURE OF THE INVENTION

Problems to be Solved

In image display apparatus 1000 described in Patent Literature 1, a cumbersome operation in which the casing is inclined must be carried out only when an image is projected.

On the other hand, if DMDs 300R, 300G, and 300B are arranged such that the long side of the image forming region is parallel to the side of the light incident surface of XDP 500, the projected image can be displayed in a normal state without inclining the casing.

In this case, however, the lights should be entered into TIR prisms 400R, 400G, and 400B from an angle of 45° to the incident surface of XDP 500, and as a result, the lights are elliptically polarized during the total reflection of the lights on first surfaces 402R, 402G, and 402B of TIR prisms 400R, 400G, and 400B. In such a case, the light incident on XDP 500 cannot be converted into S-polarized light or P-polarized light, and thus there has been a problem in which contrast or luminance of the projected image is reduced.

An object of the present invention is to provide a display apparatus and a display method that can prevent a reduction in contrast of the projected image.

Solution to Problem

A projection type display apparatus according to the present invention includes: an illumination unit that emits a plurality of color lights having a predetermined polarization direction; a plurality of optical path adjustment units that totally reflect the plurality of color lights, respectively; a plurality of optical modulation units that modulates the plurality of color lights totally reflected by the plurality of optical path adjustment units, respectively, to emit a plurality of modulated color lights; a synthesis unit that emits the plurality of modulated color lights emitted from the optical modulation units in a same direction; and a correction unit that is arranged on an optical path between the illumination unit and the synthesis unit and that changes a polarization state of light that entered the correction unit to covert light that is incident on the synthesis unit into a linearly polarized light.

An image display method according to the present invention includes: emitting a plurality of color lights having a predetermined polarization direction; totally reflecting the plurality of color lights, respectively; modulating the plurality of totally reflected color lights, respectively; emitting the plurality of modulated color lights in a same direction to synthesize the plurality of color lights; and projecting the synthesized light, wherein a polarization state of the light is changed to convert light incident on a synthesis unit that synthesizes lights into a linearly polarized light prior to the synthesis of the plurality of lights.

Effects of Invention

According to the present invention, a display apparatus that can prevent a reduction in contrast of a projected image can be provided.

DESCRIPTION OF EMBODIMENT

Hereinafter, the exemplary embodiments of the present invention will be described with reference to the accompanying drawings. Herein and throughout the drawings, components having similar functions are denoted by similar reference signs, and thus repeated description thereof may be omitted. In addition, for simplicity, a light flux is indicated by a straight line throughout the drawings.

First, a mechanism by which light reflected on a TIR prism is converted into elliptic polarized light will be described.

Figure 1:
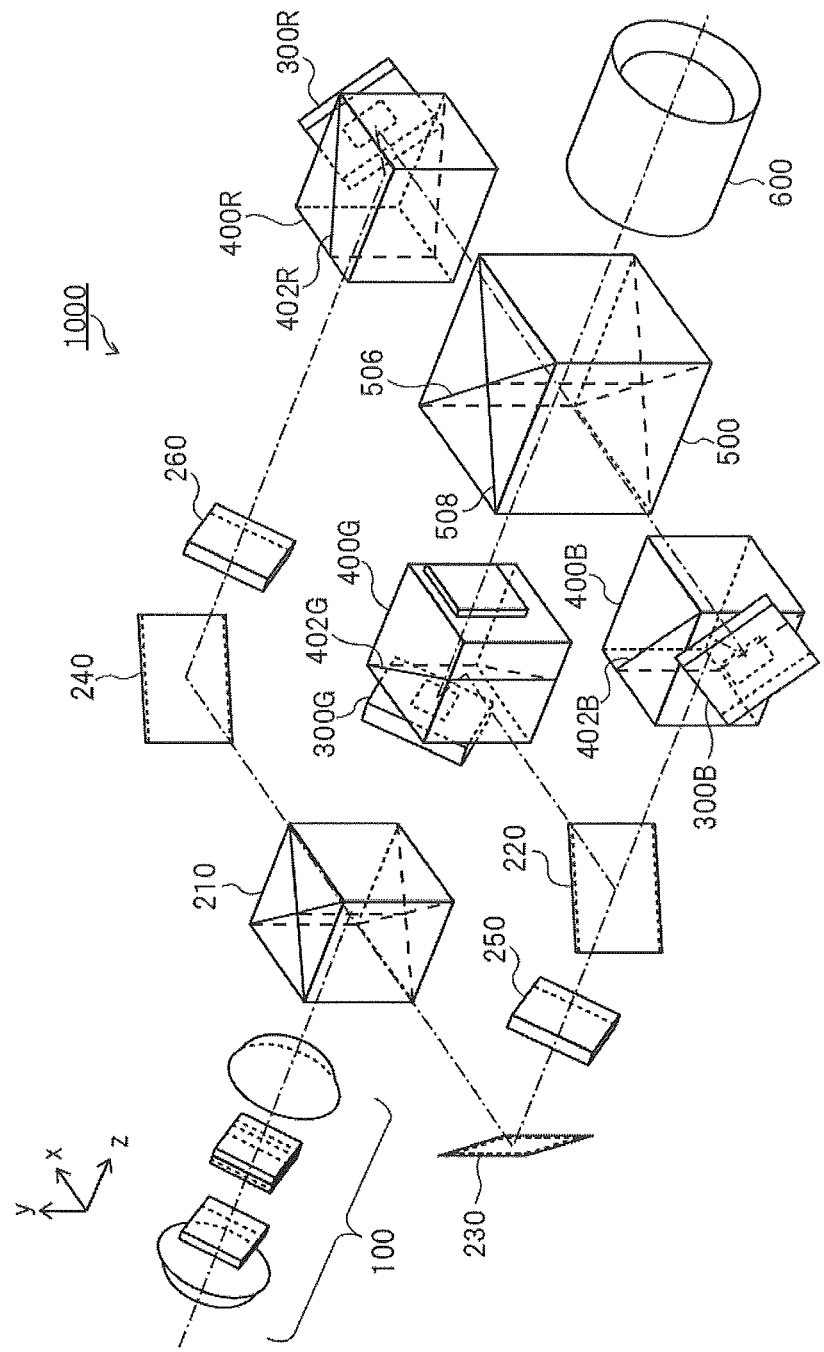
FIG. 1 A diagram illustrating the configuration of display apparatus 1000 according to the comparative example of the present invention.
Figure 2:
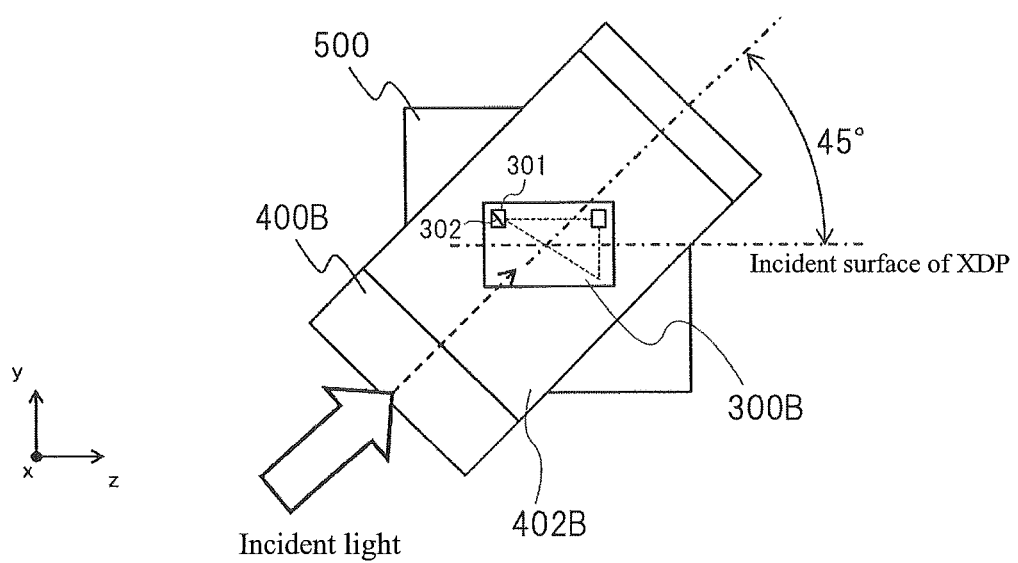
FIG. 2 A diagram illustrating the arrangement of components according to a modified example of display apparatus 1000 illustrated in FIG. 1.

FIG. 2 is a diagram illustrating the arrangement of DMD 300B, TIR prism 400B, and XDP 500.

DMD 300B is installed in parallel with the incident surface of XDP 500. In other words, the rectangular image forming region of DMD 300B and the incident surface of XDP 500 are both parallel to a yz plane. TIR prism 400B is provided between DMD 300B and XDP 500. TIR prism 400B is arranged so that incident light can enter DMD 300B from a direction roughly vertical to rotation axis 302 of micromirror 301 provided in the rectangular image forming region of DMD 300B. In other words, the incident light is totally reflected on first surface 402B that is the total reflection surface of TIR prism 400B, and then exits from TIR prism 400B to enter DMD 300B. TIR prism 400B is arranged so that first surface 402B can gradually approach the rectangular image forming region of DMD 300B. More specifically, first surface 402B is a slope with respect to the rectangular image forming region of DMD 300B, and is a slope along the direction roughly vertical to rotation axis 302 of micromirror 301.

Figure 3:
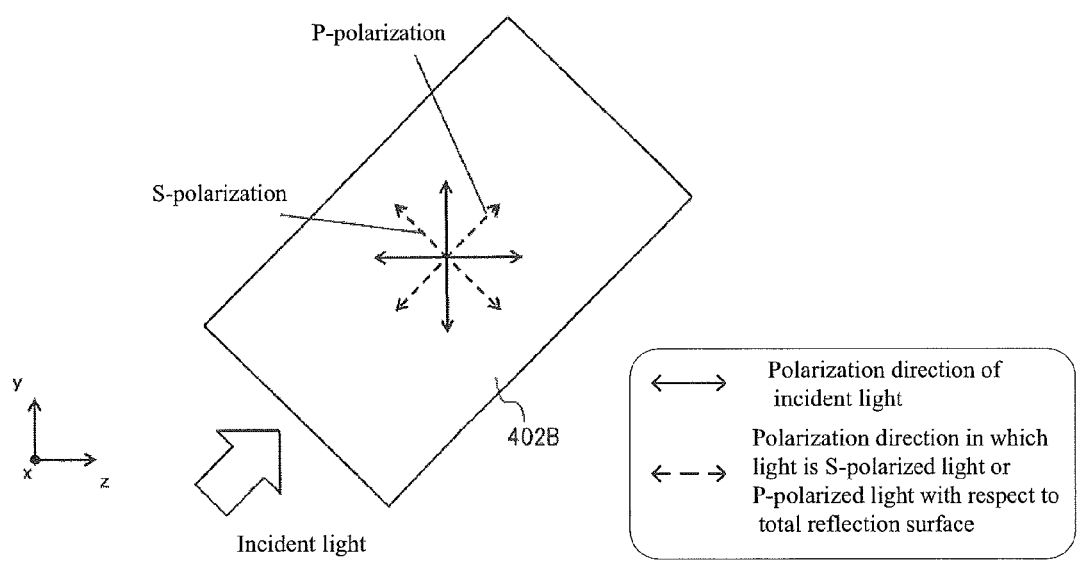
FIG. 3 A diagram illustrating a relationship between a polarization direction in which a light is S-polarized light or P-polarized light with respect to a first surface and the polarization direction of light incident on the first surface in the modified example illustrated in FIG. 2.

FIG. 3 is a diagram illustrating a relationship with the polarization direction of the light incident on first surface 402B of TIR prism 400B in the arrangement illustrated in FIG. 2. When light is made incident on TIR prism 400B from an angle of 45° with respect to the incident surface of XDP 500, an incident surface, when the light enters TIR prism 400B, is a surface that forms an angle of 45° with respect to the incident surface of XDP 500. Accordingly, a direction parallel to or vertical to the incident surface of TIR prism 400B does not match a direction parallel to or vertical to the incident surface of XDP 500, nor is light that is S-polarized light or P-polarized light with respect to second surface 506 of XDP 500 S-polarized light or P-polarized light respect to first surface 402B of TIR prism 400B. The light incident on TIR prism 400B has a polarization direction in which the light becomes S-polarized light or P-polarized light with respect to second surface 506 of XDP 500, and thus the incident light is light that includes S-polarized light component and P-polarized light component when the light enters first surface 402B of TIR prism 400B.

When the light including the S-polarized light component and the P-polarized light component is totally reflected, the polarization state of the light is disturbed. Specifically, when the light is totally reflected, a part of the energy of the light that entered the total reflection surface slightly seeps to a medium that forms the total reflection surface to generate an evanescent light. Since the energy of the evanescent light is propagated in a direction parallel to the total reflection surface, a phenomenon referred to as a Goos-Hanchen shift in which the phase of the light is varied occurs. The amount of variation in phase due to Goos-Hanchen shift is different between the S-polarized light component and the P-polarized light component. Consequently, when linear polarized light including the S-polarized light component and the P-polarized light component is totally reflected, the linear polarized light changes to be an elliptic polarized light.

The arrangement of DMD 300B, TIR prism 400B, and XDP 500 and the polarization direction when a blue light enters XDP 500 via TIR prism 400B and DMD 300B has been described. It should be noted that the same description applies to a red light and a green light.

First Exemplary Embodiment

Figure 4:
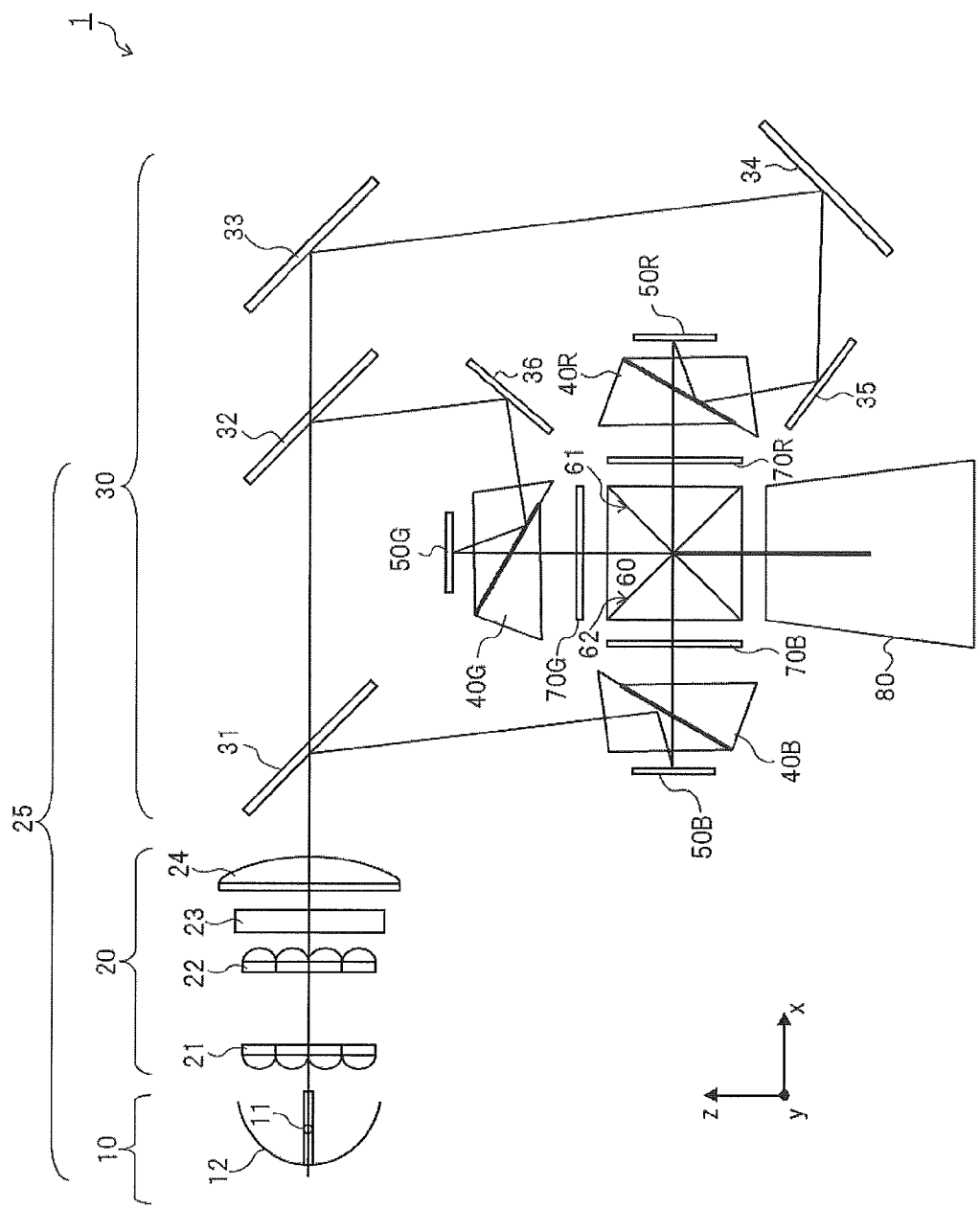
FIG. 4 A diagram illustrating the configuration of display apparatus 1 according to a first exemplary embodiment of the present invention.

FIG. 4 is a diagram illustrating the configuration of display apparatus 1 according to a first exemplary embodiment of the present invention. Display apparatus 1 includes light source 10, illumination optical system 20, light separation optical system 30, TIR prisms 40R, 40G, and 40B, DMDs 50R, 50G, and 50B, XDP 60, correction optical elements 70R, 70G, and 70B, and projection optical system 80. Projection optical system 80 is a projection unit that projects a light synthesized by XDP 60. Projection optical system 80 magnifies the incident light to project it to a screen that is not illustrated.

Light source 10 includes light source lamp 11 and reflector 12. Light source lamp 11 is, for example, a metal halide lamp or a high pressure mercury lamp, and there is no particular limitation on its type. Reflector 12 converts light that is emitted from light source lamp 11 into nearly parallel light to emit it. The nearly parallel light emitted from light source 10 enters illumination optical system 20.

Illumination optical system 20 includes first lens array 21, second lens array 22, polarization conversion element 23, and superimposed lens 24. Illumination optical system 20 generates the linear polarized light from the nearly parallel light emitted from light source 10.

Each of first lens array 21 and second lens array 22 includes many lenses arrayed in a matrix. First lens array 21 is configured to divide the incident light into the same number of light fluxes as that of the included lenses, and is configured to form an image of each divided light flux near second lens array 22.

The light emitted from second lens array 22 enters polarization conversion element 23 and is converted, by polarization conversion element 23, into linear polarized light having a predetermined polarization direction.

The linear polarized light exited from polarization conversion element 23 enters superimposed lens 24. Each light flux divided by first lens array 21 is superimposed on DMDs 50R, 50G, and 50B by superimposed lens 24.

Light separation optical system 30 separates the light from illumination optical system 20 into a plurality of lights having colors that are different from each other. For example, light separation optical system 30 includes first dichroic mirror 31 by which the blue light is reflected and through which light having wavelengths longer than that of the blue light is transmitted, and second dichroic mirror 32 by which the green light is reflected and through which light having a wavelength longer than that of the green light is transmitted. Light separation optical system 30 may further include a reflection mirror to change an optical path.

From among the lights emitted from illumination optical system 20, the blue light is reflected by first dichroic mirror 31, and the light having wavelengths longer than that of the blue light is transmitted through first dichroic mirror 31 to enter second dichroic mirror 32. From among the lights incident on second dichroic mirror 32, the green light is reflected by second dichroic mirror 32, and the light (e.g., red light) having wavelengths longer than that of the green light is transmitted through second dichroic mirror 32.

The blue light reflected by first dichroic mirror 31 enters TIR prism 40B. The green light reflected by second dichroic mirror 32 is reflected on reflection mirror 36 to enter TIR prism 40G. The red light transmitted through second dichroic mirror 32 is reflected by reflection mirrors 33, 34, and 35 to enter TIR prism 40R.

Light source 10, illumination optical system 20, and light separation optical system 30 are collectively referred to as illumination unit 25. Illumination unit 25 emits a plurality of color lights having a predetermined polarization direction.

TIR prisms 40R, 40G, and 40B are optical path adjustment units that change the optical path of the incident light. Specifically, TIR prisms 40R, 40G, and 40B totally reflect the color lights from illumination unit 25 to emit the lights toward DMDs 50R, 50G, and 50B. The color lights modulated by the micromirrors of respective DMDs 50R, 50G, and 50B are transmitted through TIR prisms 40R, 40G, and 40B to enter XDP 60.

Figure 5:
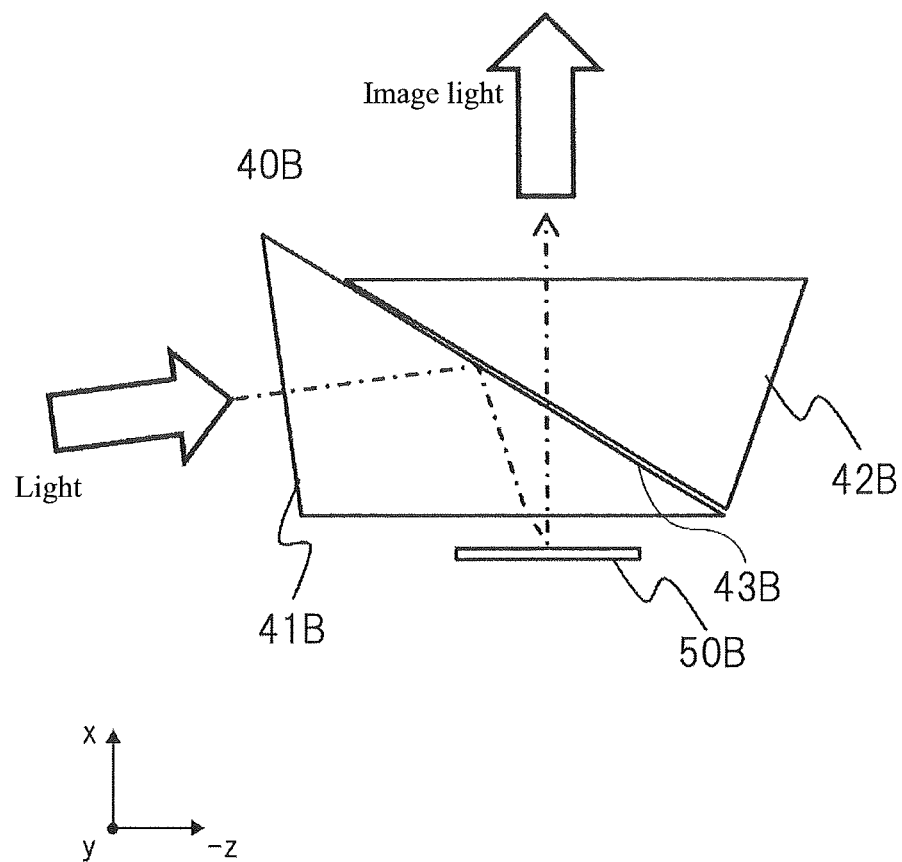
FIG. 5 A diagram illustrating the configuration of TIR prism 40B.

FIG. 5 is a diagram illustrating the configuration of TIR prism 40B. FIG. 5 illustrates TIR prism 40B and DMD 50B, and it should be noted that the same description applies to TIR prisms 40R and 40G and DMDs 50R and 50G.

TIR prism 40B illustrated in FIG. 5 includes prism 41B and prism 42B, and first surface 43B is formed between prism 41B and prism 42B by way of an air gap. Since an interface, that is made of the air gap and that has a different refractive index, is formed on first surface 43B, when light enters first surface 43B at an angle equal to or larger than a critical angle, the light is totally reflected. TIR prism 40B is arranged so that the angle of the light incident on first surface 43B from illumination unit 25 can be equal to or larger than the critical angle, so that the totally reflected light can enter DMD 50B to be modulated by each micromirror of DMD 50B, and so that the light reflected by each micromirror can enter first surface 40B at an angle smaller than the critical angle. In other words, TIR prism 40B totally reflects the light from illumination unit 25 to emit it toward DMD 50B, and transmits the light from DMD 50B to emit it toward XDP 60.

Figure 6:
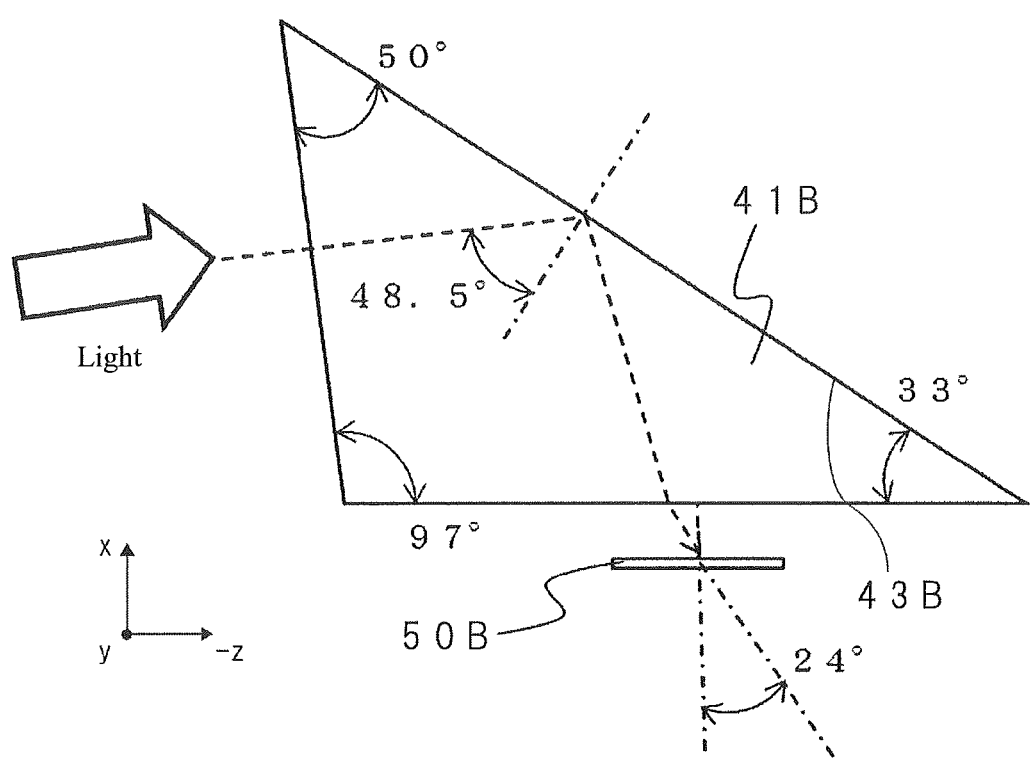
FIG. 6 A diagram illustrating the detailed configuration of a part of TIR prism 40B.

FIG. 6 is a diagram illustrating the detailed configuration of prism 41B. FIG. 6 illustrates prism 41B, and it should be noted that the same description applies to prisms 41R and 41G included in TIR prisms 40R and 40G. The inner angles of a triangle on the bottom surface of prism 41B are respectively 33°, 50°, and 97°, the refractive index of a glass is 1.517, and the angle of the light incident on first surface 43B is 48.5°. In this case, the angle at which the light emitted from prism 41B enters DMD 50B is 24°.

Referring back to FIG. 4, description will be made.

DMD 50R, 50G, and 50B are optical modulation elements that are respectively provided corresponding to TIR prisms 40R, 40G, and 40B and that are configured to modulate the lights that are totally reflected on first surfaces 43R, 43G, and 43B of the corresponding TIR prisms 40R, 40G, and 40B and that emit the lights. These optical modulation elements are also referred to as optical modulation units.

Figure 7:
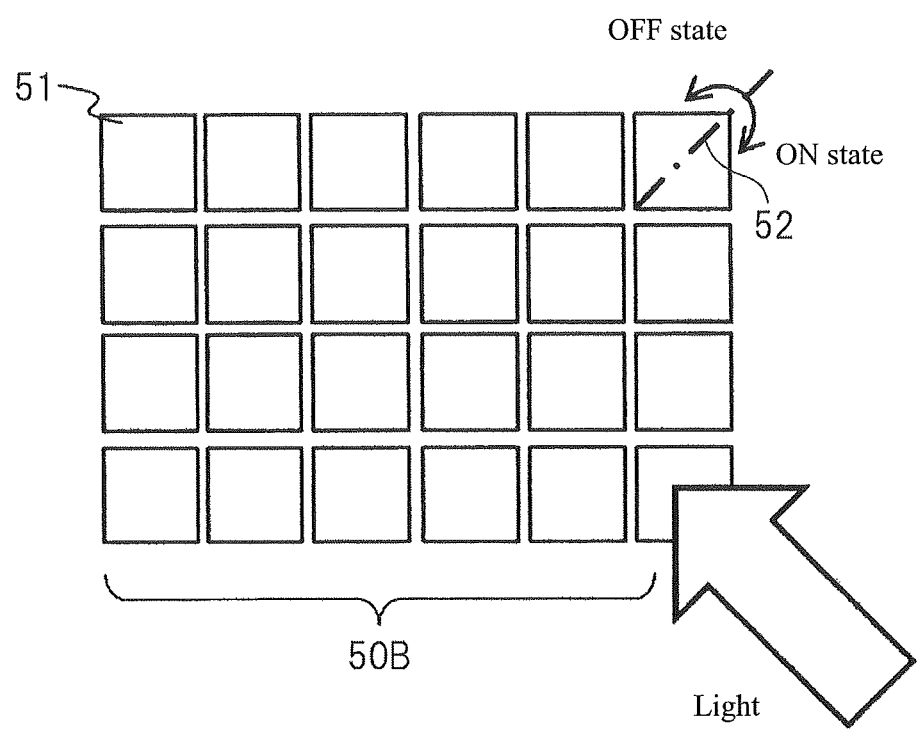
FIG. 7 A diagram illustrating the configuration of DMD 50B.

FIG. 7 is a diagram illustrating the configuration of DMD 50B. FIG. 7 illustrates DMD 50B, and it should be noted that the same description applies to DMDs 50R and 5G. DMD 50B includes a plurality of micromirrors 51 arranged in a matrix, and each micromirror 51 corresponds to one pixel of a projected image. Each micromirror 51 is rotated around rotation axis 52 to change the angle of the incident light. Micromirror 51 of DMD 50B is disposed so that rotation axis 52 is directed in the diagonal direction of square micromirror 51 and so that a plane including the incident light and the reflected light is orthogonal to rotation axis 52.

Figure 8:
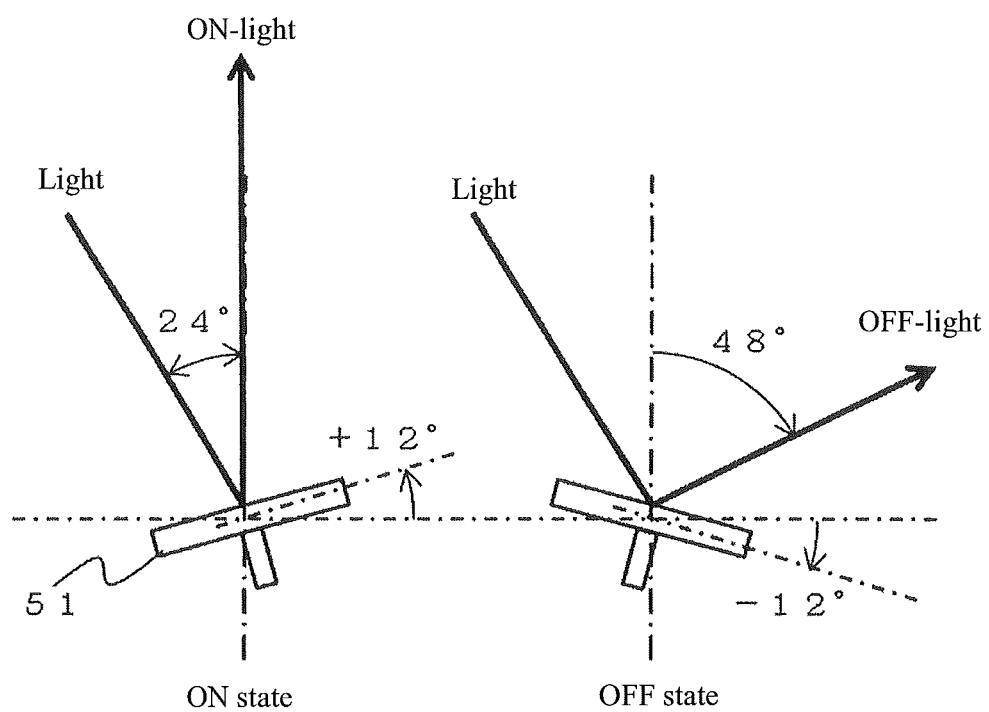
FIG. 8 A diagram illustrating the operation of micromirror 51.

FIG. 8 is a diagram illustrating the operation of micromirror 51. A control unit that is not illustrated drives each micromirror 51 according to a video signal to switch between an ON state in which the micromirror inclines in an incident direction of the light and an OFF state in which the micromirror inclines in a direction opposite the incident direction. If it is presumed that a rotational angle when the reflection surfaces of the plurality of micromirrors 51 form one plane is set to 0°, each micromirror 51 inclines by ±12° around rotation axis 52. In this case, if light of an incident angle 24° is reflected by micromirror 51 of the ON state, the light travels in a normal direction of micromirror 51 when the rotational angle is 0°. If light of an incident angle 24° is reflected by micromirror 51 of the OFF state, the light travels in a direction that makes an angle of 48° with a normal direction of micromirror 51 when the rotational angle is 0°.

The ON-lights reflected by DMDs 50R, 50G and 50B are transmitted through first surfaces 43R, 43G and 43B of TIR prisms 40R, 40G and 40B to be synthesized by XDP 60, and are then projected on the screen (not illustrated) or the like by the projection lens. The OFF-lights do not reach the screen because they are absorbed by optical absorbers that are arranged between DMDs 50R, 50G, and 50B and XDP 60. The luminance of a pixel to which each micromirror 51 corresponds is changed by changing the ratio between the time during which each micromirror 51 is in the ON state and the time during which each micromirror 51 is in the OFF state.

In FIG. 4, XDP 60 is a synthesis unit that synthesizes the lights respectively exited from DMDs 50R, 50G and 50B by reflecting or transmitting the lights by or through second surfaces 61 and 62 to emit them in the same direction.

Specifically, green light that is P-polarized light is transmitted through second surfaces 61 and 62, red light that is S-polarized light is reflected by second surface 61, and blue light that is an S-polarized light is reflected on second surface 62. However, even when illumination unit 25 emits linear polarized light that is S-polarized light or P-polarized light to second surfaces 61 and 62, the polarization state is disturbed during the reflection on the first surface of TIR prism 40 to be converted to an elliptic polarized light.

Figure 9:
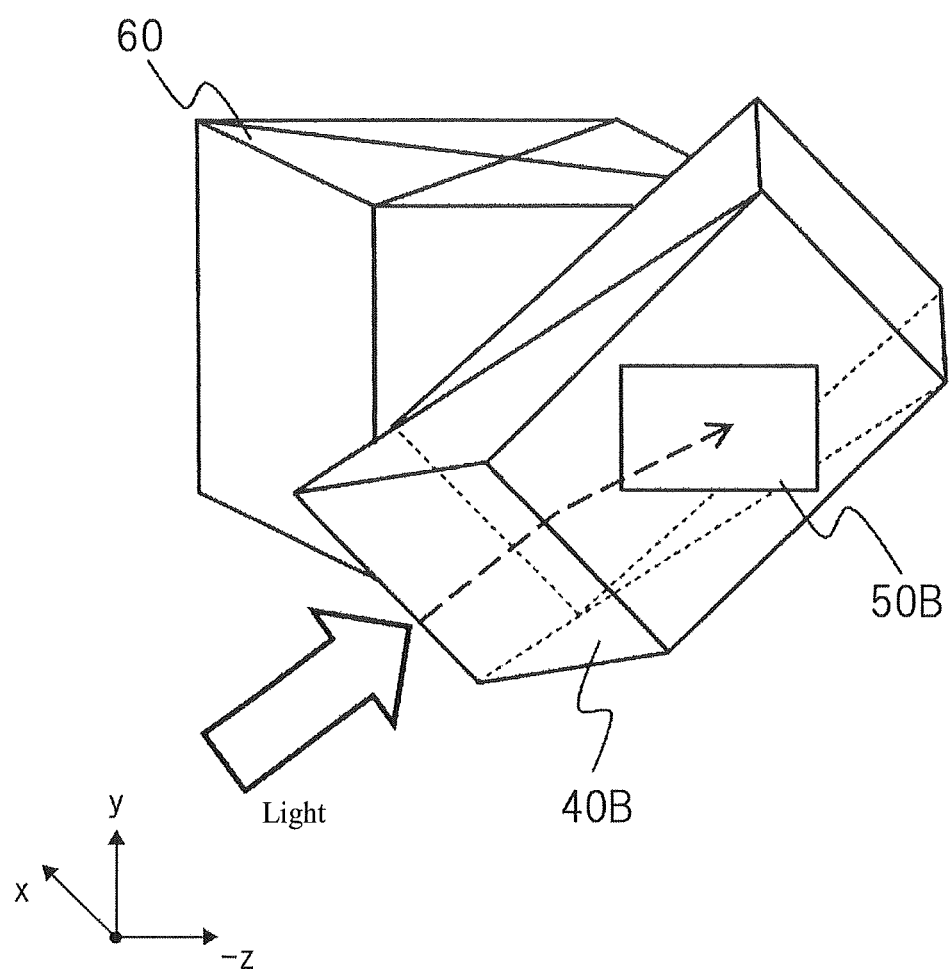
FIG. 9 A diagram illustrating the relative arrangement of TIR prism 40B, DMD 50B, and XDP 60.
Figure 10:
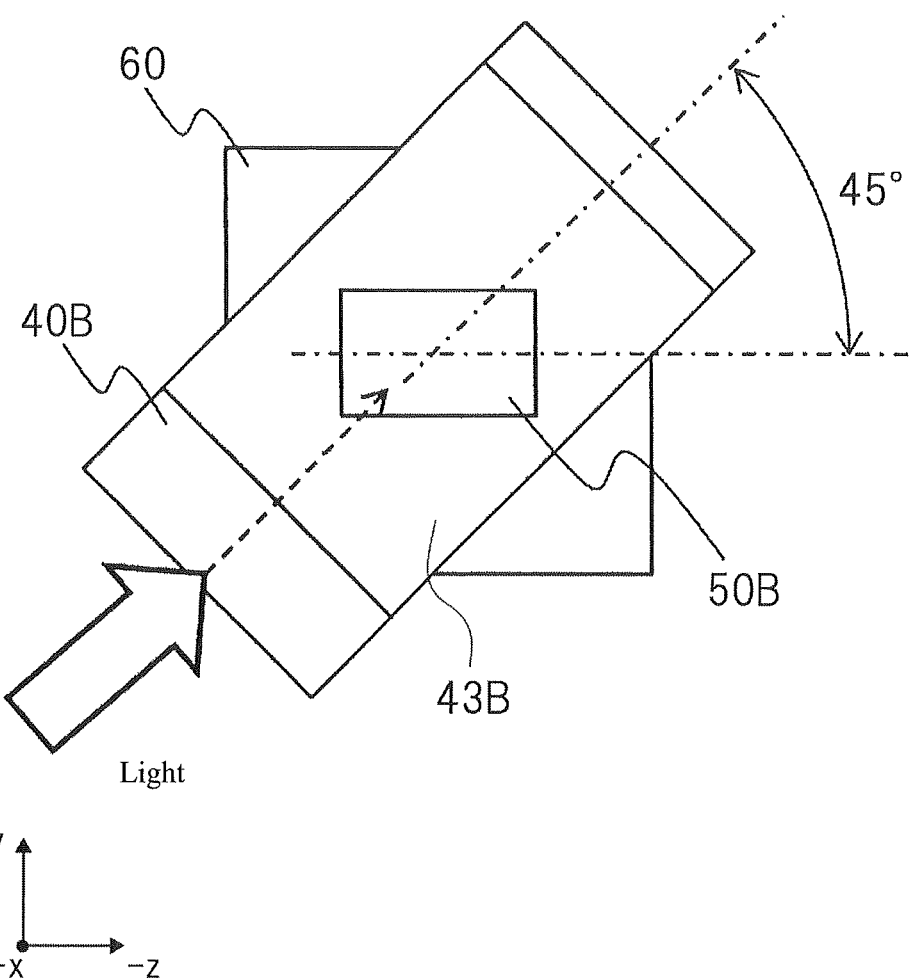
FIG. 10 A diagram illustrating the relative arrangement of TIR prism 40B, DMD 50B, and XDP 60.

FIGS. 9 and 10 are diagrams illustrating the relative arrangement of TIR prism 40B, DMD 50B, and XDP 60. DMD 50B and TIR prism 40B are arranged so that rotation axis 52 provided in the diagonal direction of each micromirror 51 located in the image forming region of DMD 50B and a plane including incident light and reflected light are orthogonal to each other. In addition, DMD 50B is disposed with respect to XDP 60 so that the long side of the image forming region of DMD 50B and the side of the upper surface of XDP 60 are parallel to each other. The light enters TIR prism 40B at an angle of 45° to the incident surface of XDP 60. Accordingly, the light totally reflected by first surface 43B of TIR prism 40B enters DMD 50 at the angle of 45° to the incident surface of XDP 60.

Figure 11:
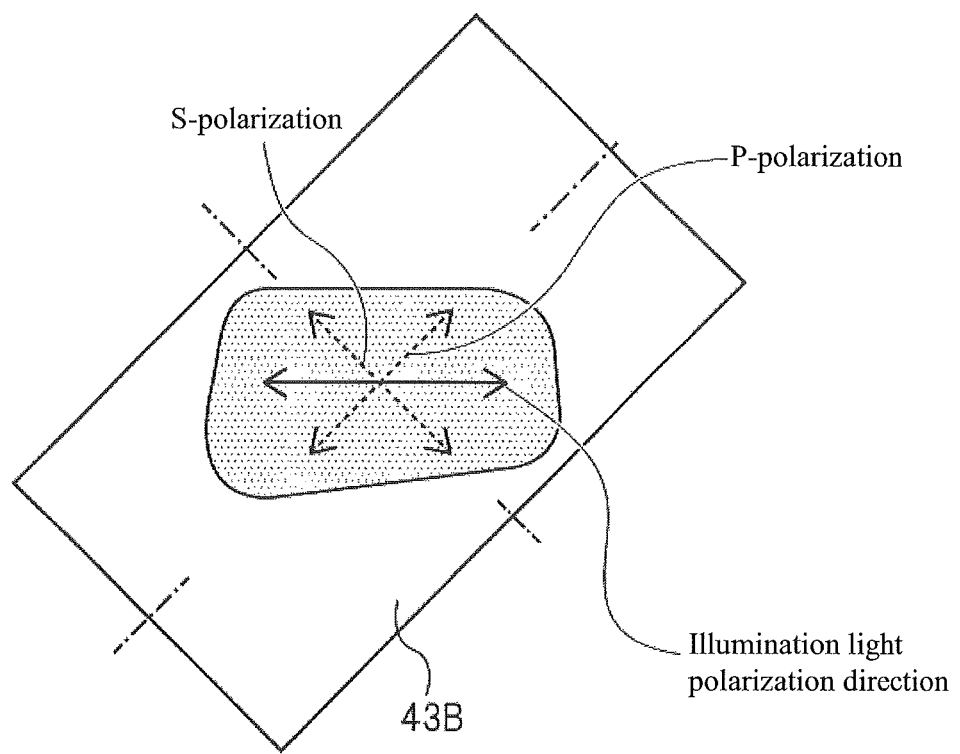
FIG. 11 A diagram illustrating a relationship between the polarization direction of light incident on TIR prism 40B and a polarization direction in which the light is S-polarized light or P-polarized light with respect to first surface 43B of TIR prism 40B.

FIG. 11 is a diagram illustrating a relationship between the polarization direction of the light incident on TIR prism 40B and a polarization direction in which the light is S-polarized light or P-polarized light with respect to first surface 43B of TIR prism 40B. In an example illustrated in FIG. 11, the light incident on TIR prism 40B has a polarization direction in which the light is P-polarized light with respect to second surfaces 61 and 62 of XDP 60. However, since the direction of the slope of first surface 43B and the polarization direction of the incident light do not match nor intersect each other, the light incident on TIR prism 40B is light that includes an S-polarized light component and a P-polarized light component with respect to first surface 43B.

Figure 12:
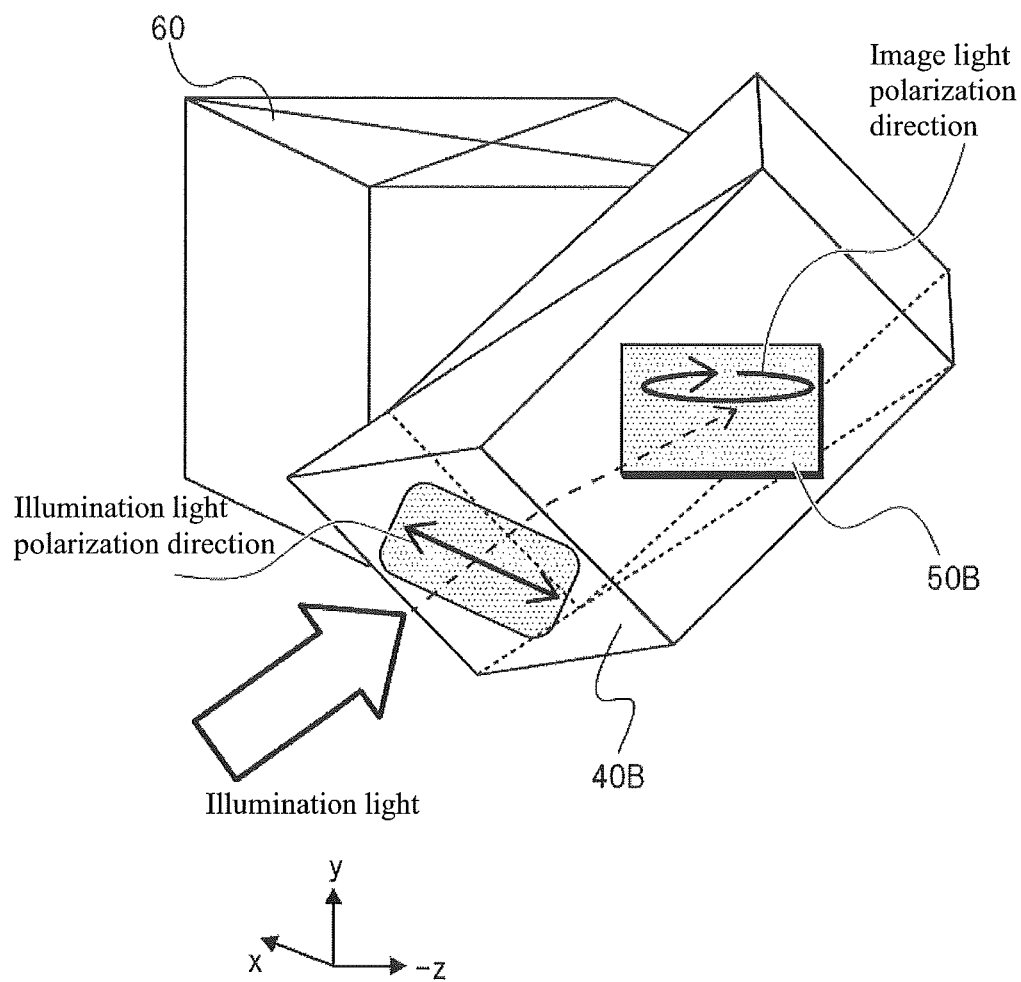
FIG. 12 A diagram illustrating the polarization states of the light incident on TIR prism 40B and image light exited from DMD 50B.

FIG. 12 is a diagram illustrating the polarization states of the light incident on TIR prism 40B and image light emitted from DMD 50B. The light incident on TIR prism 40B, which is linear polarized light that is polarized in a direction parallel or vertical to the incident surface of XDP 60, includes an S-polarized light component and a P-polarized light component with respect to first surface 43B. In this case, a phase change of light, referred to as a Goos-Hanchen shift, occurs when totally reflecting the light on first surface 40B. The amount of this phase change is different between the S-polarized light component and the P-polarized light component. For example, in the case of TIR prism 40B having the configuration illustrated in FIG. 5 and FIG. 6, a phase change that occurs on first surface 43B of TIR prism 40B is 56.4° at S polarization, and 102.0° at P polarization. Thus, a relative phase difference generated between the S-polarized light and the P-polarized light after totally reflecting the light is 45.6°. This relative phase difference is equal to about a ⅛ wavelength.

In this way, when the inclination direction of the total reflection surface and the polarization direction of the linear polarized light do not match nor intersect each other, the linear polarized light reflected on the total reflection surface becomes an elliptic polarized light. Accordingly, the light incident on DMD 50B from TIR prism 40B becomes an elliptic polarized light. Since the polarization state of the light does not change when the light is reflected on DMD 50B, the light modulated by DMD 50B becomes an elliptic polarized light.

FIGS. 9 to 12 illustrate the arrangement of TIR prism 40B, DMD 50B, and XDP 60 through which the blue light is transmitted and the polarization state of the blue light, and it should be noted that the same description applies to the red light and the green light.

Correction optical elements 70R, 70G, and 70B illustrated in FIG. 4 are a correction unit that is arranged on an optical path between illumination unit 25 and XDP 60 and that changes the polarization state of the incident light to convert the light incident on XDP 60 into S-polarized light or P-polarized light. Correction optical elements 70R, 70G, and 70B are arranged on optical paths between respective TIR prisms 40R, 40G, and 40B and XDP 60. Correction optical elements 70R, 70G, and 70B correct lights that are modulated by DMDs 50R, 50G, and 50B and that are respectively transmitted through TIR prisms 40R, 40B, and 40G to be linear polarized lights. XDP 60 is designed to synthesize, with respect to image lights emitted from DMDs 50R, 50G, and 50B, the respective lights of the polarized light components of specific directions on the same optical axis. Therefore, correction optical elements 70R, 70G, and 70B correct the light incident on XDP 60 to be light polarized in the specific direction. More specifically, correction optical elements 70R, 70G, and 70B are provided for each color light emitted from illumination unit 25, green color correction optical element 70G provided corresponding to the green light converts the incident elliptic polarized light into a P-polarized light, and red color correction optical element 70R and blue color correction optical element 70B convert the incident elliptic polarized lights into S-polarized lights.

The lights incident on correction optical elements 70R, 70G, and 70B have been totally reflected on first surfaces 43R, 43G, and 43B of TIR prisms 40R, 40G, and 40B to be changed from linear polarized lights to elliptic polarized lights. Correction optical elements 70R, 70G, and 70B change, for example, the phases of the S-polarized light component and the P-polarized light component of the incident light so as to cancel the relative phase difference between the S-polarized light component and the P-polarized light component of the light that is generated when totally reflecting the light by TIR prisms 40R, 40G, and 40B. In the configuration illustrated in FIGS. 4 to 12, correction optical elements 70R, 70G, and 70B include at least one ⅛ wavelength plate (⅛ λ plate), and for example, correction optical elements 70R, 70G, and 70B are ⅛ wavelength plates or ⅝ wavelength plates (⅝ λ plates). Green correction optical element 70G that corresponds to light that is transmitted through second surfaces 61 and 62 of XDP 60 is a ⅝ wavelength plate. Red color correction optical element 70R and blue color correction optical element 70B that correspond to lights that are reflected by second surfaces 61 and 62 of XDP 60 are ⅛ wavelength plates. Accordingly, the red image light is corrected from an elliptic polarized light to a light polarized in a direction vertical to the incident surface of XDP 60, the green image light is corrected from an elliptic polarized light to a light polarized in a direction parallel to the incident surface of XDP 60, and the blue image light is corrected from an elliptic polarized light to a light polarized in the direction vertical to the incident surface of XDP 60. As a result, when entering first surface 61 or 62 of XDP 60, the red and blue image lights are converted into S-polarized lights while the green image light is converted into a P-polarized light.

For green light correction optical element 70G, in place of the ⅝ wavelength plate, a ½ wavelength plate (½ λ plate) and a ⅛ wavelength plate (⅛ λ plate) may be arrayed in a light traveling direction. Correction optical elements 70R, 70G, and 70B may be configured in any manner as long as the lights that are transmitted through second surfaces 61 and 62 of XDP 60 are converted into P-polarized lights while the light that is reflected by second surface 61 and light that is reflected by second surface 62 are converted into S-polarized lights.

Modified Example

In the aforementioned embodiment, correction optical elements 70R, 70G, and 70B change the phases of the S-polarized light component and the P-polarized light component of the incident light so as to cancel the relative phase difference between the S-polarized light component and the P-polarized light component of the light that is generated when totally reflecting the light by TIR prisms 40R, 40G, and 40B. However, the present invention is not limited to this example. For example, correction optical elements 70R, 70G, and 70B may change the polarization state of the incident light so as to cancel the light of a polarized light component other than the specific direction incident on XDP 60.

Specifically, correction optical elements 70R, 70G, and 70B include at least one polarization plate. For example, red correction optical element 70R and blue correction optical element 70B that correspond to the light incident on second surface 61 or 62 of XDP 60 may be polarization plates. In this case, for green correction optical element 70G that corresponds to light that is transmitted through second surfaces 61 and 62 of XDP 60, a polarization plate and a ½ wavelength plate may be arrayed in this order in the light traveling direction. The polarization plate transmits only the light of a specific direction while absorbing or reflecting the light of the other polarization direction. The polarization plates used for correction optical elements 70R, 70G, and 70B all have characteristics of transmitting the polarized light of a direction vertical to the incident surface of XDP 60. Accordingly, the light that is transmitted through the polarization plate is converted into S-polarized light, and by further transmission through the ½ wavelength plate, the green light is converted into P-polarized light.

As described above, according to the first exemplary embodiment of the present invention, the plurality of color lights, that have the predetermined polarization direction and that are emitted from illumination unit 25, enters the plurality of TIR prisms 40R, 40G, and 40B to be totally reflected. The totally reflected lights are respectively modulated by DMDs 50R, 50G, and 50B that are provided corresponding to TIR prisms 40R, 40G, and 40B. The respective lights emitted from respective DMDs 50R, 50G, and 50B are synthesized by XDP 60 to be emitted. Correction optical elements 70R, 70G, and 70B, which change the polarization state so that the light incident on XDP 60 becomes S-polarized light or P-polarized light, are arranged on the optical paths between illumination unit 25 and XDP 60. As a result, even when the light is converted into an elliptic polarized light prior to entering XDP 60, since the light incident on XDP 60 can be converted into S-polarized light or P-polarized light, the generation of a stray light in XDP 60 can be prevented and a reduction in contrast of the projected light can be prevented.

According to the present invention, correction optical elements 70R, 70G, and 70B change the polarization state of the light so as to cancel the phase difference between the S-polarized light component and the P-polarized light component of the light that is generated when totally reflecting the light by TIR prisms 40R, 40G, and 40B. As a result, even when a phase difference is generated between the S-polarized light component and the P-polarized light component during the total reflection of the light on TIR prisms 40R, 40G, and 40B, since the phase difference is cancelled, it is able to more surely prevent a reduction in contrast of the projected image. In addition, since a light that has been a stray light can be used as a projection light by canceling the phase difference, the luminance of the projected image can be improved.

According to the present invention, correction optical elements 70R, 70G, and 70B include at least one ⅛ wavelength plate. More specifically, XDP 60 reflects or transmits the respective color modulated lights to emit them in the same direction. In this case, correction optical elements 70R, 70G, and 70B are provided corresponding to each light that is incident on XDP 60, correction optical elements 70R and 70B that correspond to the lights that are reflected on XDP 60 are ⅛ wavelength plates, and correction optical element 70G that corresponds to the light that is transmitted through XDP 60 includes at least one ½ wavelength plate. As a result, in the case where a phase difference equivalent to a ⅛ wavelength is generated on reflection surfaces 43R, 43G, and 43B of TIR prisms 40R, 40G, and 40B, a reduction in contrast of the projected image can be more reliably prevented and the luminance of the projected image can be increased.

According to the present invention, correction optical elements 70R, 70G, and 70B are respectively provided on the optical paths between TIR prisms 40R, 40G, and 40B and XDP 60. As a result, since the light is converted into linear polarized light in which the polarization state of the light has been converted immediately before its entry into XDP 60, the light incident on XDP 60 can be more reliably converted into linear polarized light, and a reduction in contrast of the projected image can be reduced.

Furthermore, according to the modified example of the embodiment, correction optical elements 70R, 70G, and 70B include at least one polarization plate. More specifically, XDP 60 reflects or transmits the respective color modulated lights to emit them in the same direction. In this case, correction optical elements 70R, 70G, and 70B are provided corresponding to each light that is incident on XDP 60, correction optical elements 70R and 70B that correspond to the lights that are reflected by XDP 60 are polarization plates, and correction optical element 70G that corresponds to the light that transmits through XDP 60 includes a polarization plate and one ½ wavelength plate. Accordingly, from among the lights incident on XDP 60, the components other than S-polarized light or P-polarized light polarized in the direction vertical or parallel to the incident surface of XDP 60 are reflected or absorbed. As a result, a light that is a stray light in XDP 60 can be more reliably reduced and a reduction in contrast of the projected image can be prevented.

Second Exemplary Embodiment

Figure 13:
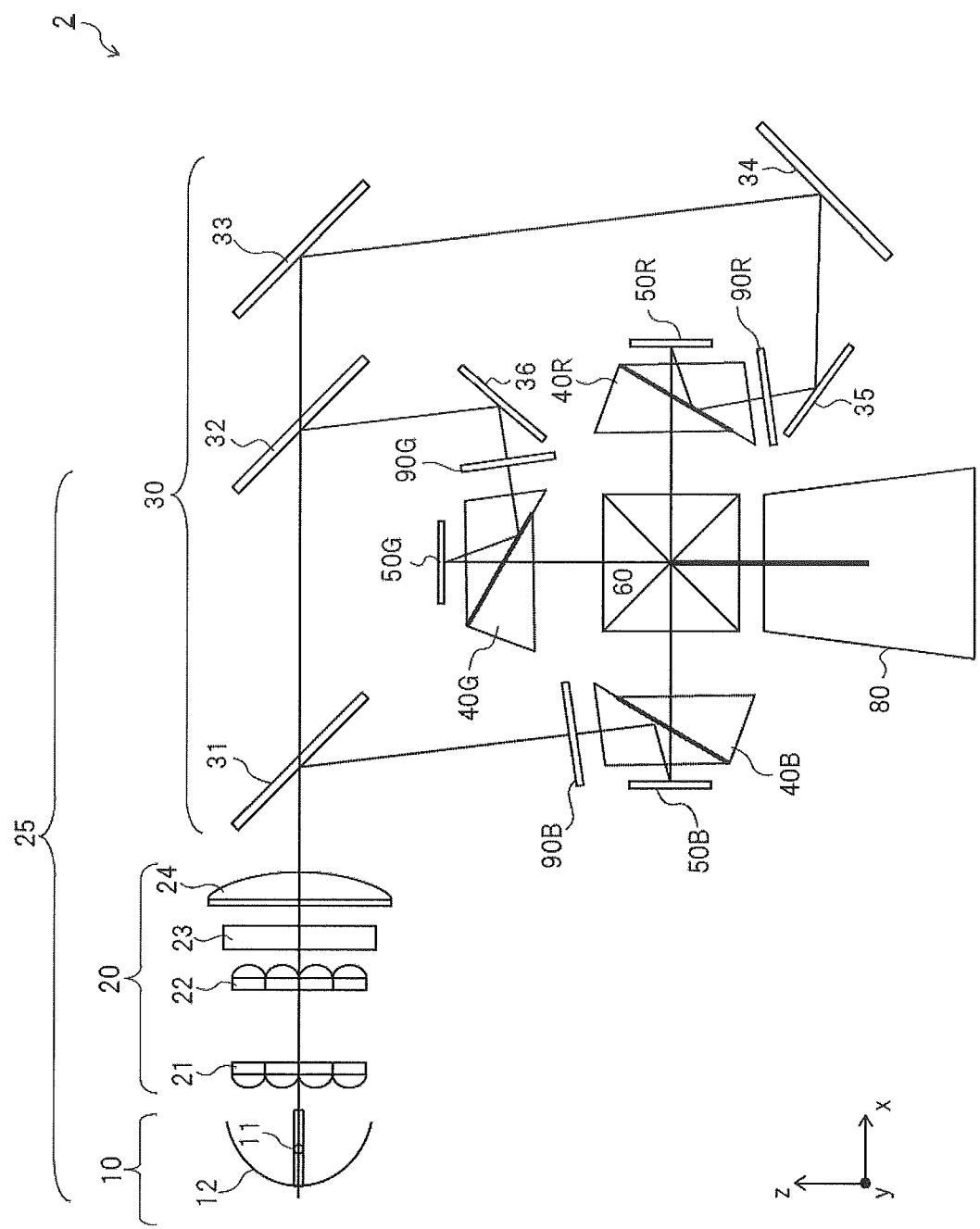
FIG. 13 A diagram illustrating the configuration of display apparatus 2 according to a second exemplary embodiment of the present invention.

FIG. 13 is a diagram illustrating the configuration of display apparatus 2 according to a second exemplary embodiment of the present invention.

Display apparatus 1 includes correction optical elements 70R, 70G, and 70B that convert the lights into linear polarized lights after the polarization state has been disturbed on TIR prisms 40R, 40G, and 40B, and correction optical elements 70R, 70G, and 70B are arranged between TIR prisms 40R, 40G, and 40B and XDP 60. On the other hand, display apparatus 2 includes, in place of correction optical elements 70R, 70G, and 70B, correction optical elements 90R, 90G, and 90B that convert lights into elliptic polarized lights before entry into TIR prisms 40R, 40G, and 40B so that the lights are totally reflected by TIR prisms 40R, 40G, and 40B are of linear polarized lights.

Hereinafter, differences from display apparatus 1 will be described.

Display apparatus 2 includes correction optical elements 90 arranged on optical paths between illumination unit 25 and TIR prisms 40R, 40G, and 40B, for example, on optical paths between light separation optical system 30 and TIR prisms 40R, 40G, and 40B. More specifically, display apparatus 2 includes red correction optical element 90R that is provided between reflection mirror 35 and red TIR prism 40R, and green correction optical element 90G that is provided between second dichroic mirror 32 and green TIR prism 40G. In addition, display apparatus 2 includes blue correction optical element 90B that is provided between first dichroic mirror 31 and blue TIR prism 40B.

Each of correction optical elements 90R, 90G, and 90B changes the polarization state of incident light so that light incident on XDP 60 becomes linear polarized light having a predetermined polarization direction. Specifically, correction optical elements 90R, 90G, and 90B correct the polarization states of the lights in advance prior to entering TIR prisms 40R, 40G, and 40B so as to cancel a relative phase difference generated between S-polarized light and P-polarized light on a total reflection surface.

As described above in the first embodiment, in the configuration illustrated in FIGS. 5 to 12, the relative phase difference that is approximately equal to a ⅛ wavelength is generated between P-polarized light and S-polarized light. Correction optical elements 90R, 90G, and 90B apply a phase difference reverse in sign but equal in size to this relative phase difference to linearly polarized illumination lights prior to entering TIR prisms 40R, 40G, and 40B to convert the linear polarized lights into elliptic polarized lights. For example, red correction optical element 90R and blue correction optical element 90B are ⅛ wavelength plates, while green correction optical element 90G is a ⅝ wavelength plate.

Figure 14:
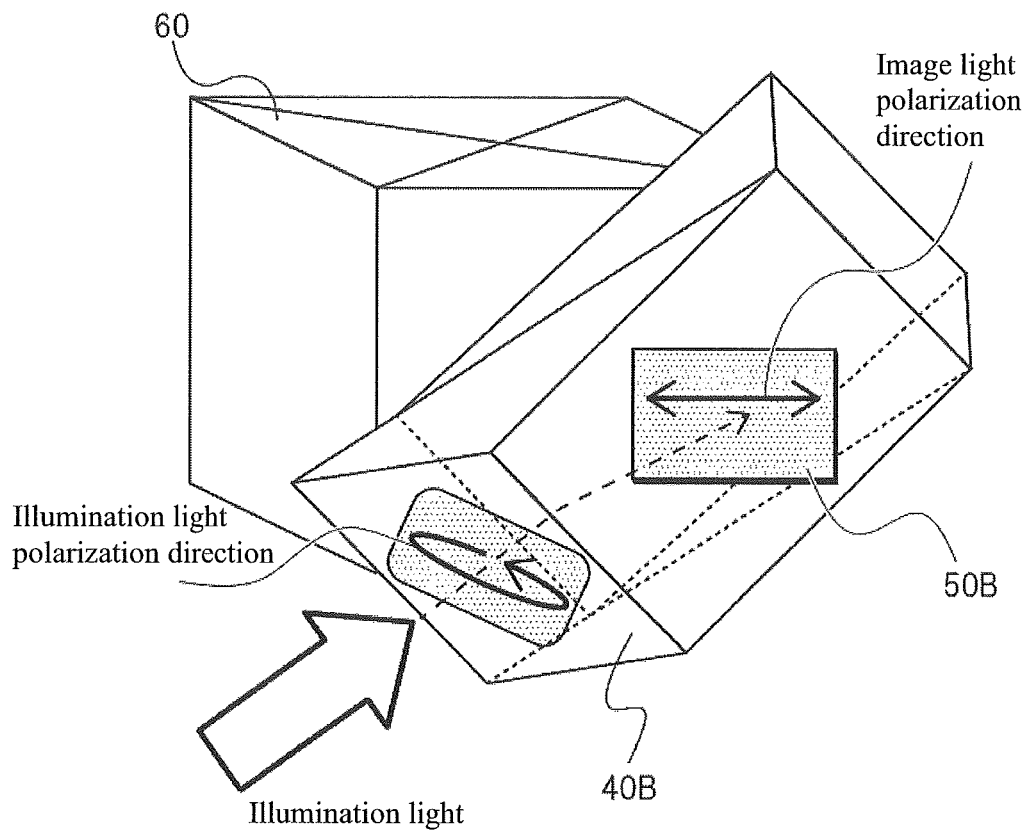
FIG. 14 A diagram illustrating the polarization states of light incident on TIR prism 40B and image light emitted from DMD 50B in display apparatus 2.

FIG. 14 is a diagram illustrating the polarization states of light incident on TIR prism 40B and color light on the total reflection surface of TIR prism 40B in display apparatus 2. Color light that is transmitted through correction optical element 90B of display apparatus 2 to enter TIR prism 40B is converted into an elliptic polarized light. When this elliptic polarized light is totally reflected by the total reflection surface of TIR prism 40B, a Goos-Hanchen shift occurs, thereby causing changes in a phase. The amount of this phase change varies between S-polarized light and P-polarized light. However, by combining the amount of a phase change generated due to transmission through correction optical element 90 with the amount of the phase change generated due to the Goos-Hanchen shift, the change amount in the case of S-polarized light and the change amount in the case of P-polarized light are made approximately equal to each other, thereby reducing a relative phase difference.

Accordingly, light incident on DMD 50B is converted into linear polarized light polarized in a direction parallel to the incident surface of XDP 60. Since the polarization state is not changed while being reflected on DMD 50B, image light emitted from DMD 50B is also converted into linear polarized light polarized in the direction parallel to the incident surface of XDP 60.

FIG. 14 illustrates the change in polarization state until the blue light enters XDP 60 via TIR prism 40B and DMD 50B, and it should be noted that the same description applies to the red light and the green light.

Modified Example

In the aforementioned second embodiment, correction optical elements 90R, 90G, and 90B, which are arranged between light separation optical system 30 and respective TIR prisms 40R, 4G, and 40B, correct the polarization states of the illumination lights immediately prior to entering respective TIR prisms 40R, 4G, and 40B. However, the present invention is not limited to this example. The arrangement and the number of correction optical elements 90R, 90G, and 90B included in display apparatus 2 may be set in any manner as long as light incident on projection optical system 80 increases.

For example, in place of correction optical elements 90R, 90G, and 90B, one correction optical element may be installed between illumination optical system 20 and light separation optical system 30. In this case, since the rotational direction of polarized light changes on each reflection surface, the number of reflection surfaces must be taken into consideration. In addition, in place of correction optical elements 90R, 90G, and 90B, two correction optical elements may be installed between first dichroic mirror 31 and blue TIR prism 40B and between first dichroic mirror 31 and second dichroic mirror 32, respectively.

For green light correction optical element 70G, in place of the ⅝ wavelength plate, a ½ wavelength plate and a ⅛ wavelength plate may be arrayed in a light traveling direction.

As described above, according to the second embodiment of the present invention, correction optical elements 90R, 90G, and 90B are arranged on the optical paths between illumination unit 25 and respective TIR prisms 40R, 40G, and 40B. As in the aforementioned case, a reduction in contrast of a projected image can be prevented. Further, compared with the case where the polarization states of the lights emitted from TIR prisms 40R, 40G, and 40B are corrected, the freedom in the arrangement and the number of correction optical elements can be increased, and the arrangement and the number of correction optical elements can be flexibly designed according to the design conditions of display apparatus 2.

Third Exemplary Embodiment

Figure 15:
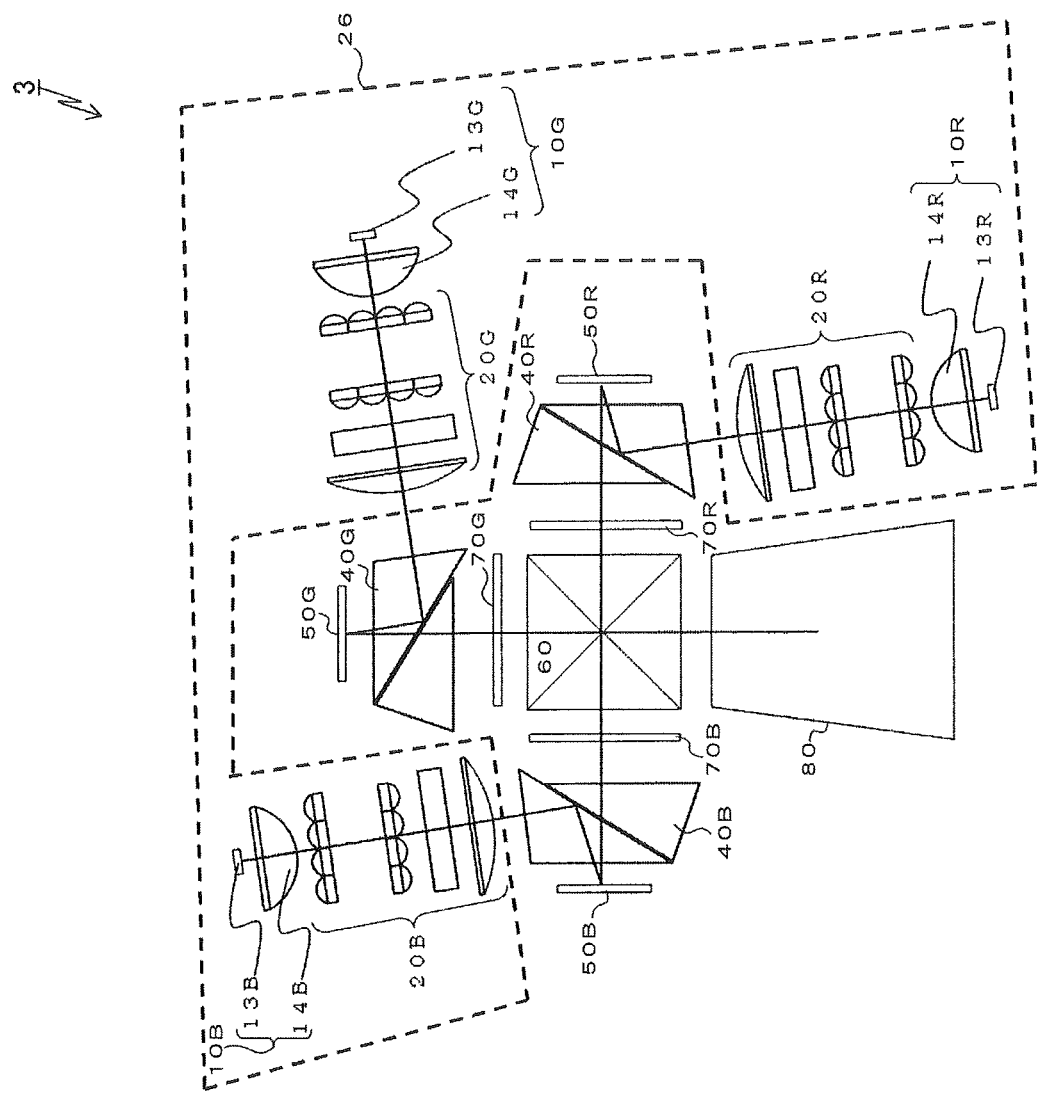
FIG. 15 A diagram illustrating the configuration of display apparatus 3 according to a third exemplary embodiment of the present invention.

FIG. 15 is a diagram illustrating the configuration of display apparatus 3 according to a third exemplary embodiment of the present invention.

Illumination unit 25 in display apparatus 1 and display apparatus 2 separates a white light into a plurality of color lights to use them as illumination lights for illuminating DMD 50. On the other hand, illumination unit 26 of display apparatus 3 uses color light emitted from each of a plurality of light sources as an illumination light.

Illumination unit 26 includes light sources 10R, 10G, and 10B that emits red, green, and blue lights, respectively and illumination optical systems 20R, 20G, and 20B including conversion optical systems that convert the red, green, and blue lights into color illumination lights having predetermined polarization directions, respectively.

Each light source 10 includes light emitting element 13 that emits each color light, and lens 14 that converts the color light emitted from light emitting element 13 into nearly parallel light. For example, light source 10R includes light emitting element 13R that emits a red light, and lens 14R that converts the color light emitted from light emitting element 13R into nearly parallel light. Light emitting element 13 is, for example, a LED (Light Emitting Diode).

Illumination optical systems 20R, 20G, and 20B convert the incident color lights into linear polarized lights for uniformly illuminating DMDs 50R, 50G, and 50B. Illumination optical system 20R and illumination optical system 20B convert the incident color lights into linear polarized lights polarized in a direction vertical to the incident surface of XDP 60, while illumination optical system 20G converts the incident color light into linear polarized light polarized in a direction parallel to the incident surface of XDP 60. The respective lights emitted from respective illumination optical systems 20 respectively enter TIR prisms 40R, 40G, and 40B.

As described above, according to the third embodiment of the present invention, illumination optical system 26 includes the plurality of light sources 13R, 13G, and 13B for emitting the color lights. Thus, the luminance of a projected image can be improved because the plurality of light sources is used, and the apparatus can be reduced in size because a separation optical system for separating the white light into a plurality of color lights does not need to be provided. As a result, even in the configuration in which the luminance is improved and in which the apparatus is reduced in size, a reduction in contrast of the projected image can be prevented.

The present invention has been described by way of exemplary embodiments. However, the present invention is not limited to the aforementioned exemplary embodiments. Various changes understandable to those skilled in the art can be made to the configuration and the specifics of the present invention within the scope of the invention.

For example, in the first and second exemplary embodiments, light source 10 includes light source lamp 11, and reflector 12 that converts the light emitted from light source lamp 11 into the nearly parallel light. However, the present invention is not limited to this example. For example, by using a lens, the light emitted from light source lamp 11 may be converted into nearly parallel light. In this case, a LED or a phosphor that absorbs exciting energy to radiate a fluorescent light can be used as light source lamp 11.

In the aforementioned exemplary embodiment, illumination optical system 20 adopts a configuration in which first lens array 21, second lens array 22, polarization conversion element 23 and superimposed lens 24 are used. However, the present invention is not limited to this example. For example, illumination optical system 20 may adopt a configuration such that a rod integrator is used.

In the aforementioned exemplary embodiment, superimposed lens 24 is a single optical component. However, the present invention is not limited to this example. For example, superimposed lens 24 may be a plurality of lenses or may adopt a configuration where a folding mirror is added in order to improve the performance of illumination optical system 20 or in order to adjust the size of the apparatus.

Furthermore, in the aforementioned exemplary embodiment, the arrangement of the correction optical elements in display apparatus 3 according to the third exemplary embodiment is similar to that in display apparatus 1 according to the first exemplary embodiment. However, the present invention is not limited to this example. For example, the arrangement of the correction optical elements in display apparatus 3 can be changed to be similar to that of the second embodiment.

EXPLANATION OF REFERENCE NUMBERS 1, 2, 3 Display apparatus
10 Light source
11 Light source lamp
12 Reflector
20 Illumination optical system
21 First lens array
22 Second lens array
23 Polarization conversion element
24 Superimposing lens
25, 26 Illumination unit
30 Light separation optical system (separation unit)
31 First dichroic mirror
32 Second dichroic mirror
33, 34, 35 Reflection mirror
40R, 40G, 40B TIR prism (optical path adjustment unit)
50R, 50G, 50B DMD (optical modulation unit)
60 XDP (synthesis unit)
70R, 70G, 70B Correction optical element (correction unit)
90R, 90G, 90B Correction optical element (correction unit)
80 Projection optical system (projection unit)

The invention claimed is:
1. A projection type display apparatus comprising:
an illumination unit that emits a plurality of color lights having a predetermined polarization direction;
a plurality of optical path adjustment units that totally reflect the plurality of color lights, respectively;
a plurality of optical modulation units that modulate the plurality of color lights totally reflected by the plurality of optical path adjustment units, respectively, to emit a plurality of modulated color lights;
a synthesis unit that emits the plurality of modulated color lights emitted from the optical modulation units in a same direction;
a correction unit that is arranged on an optical path between the illumination unit and the synthesis unit and that changes a polarization state of light that entered the correction unit to covert light that is incident on the synthesis unit into linearly polarized light; and
wherein the correction unit changes the polarization state of the entered light to cancel a phase difference between an S-polarized light component and a P-polarized light component of light that is generated when light is totally reflected by the optical path adjustment unit.

2. The projection type display apparatus according to claim 1, wherein the correction unit includes at least one ⅛ wavelength plate.

3. The projection type display apparatus according to claim 2,
wherein the synthesis unit reflects or transmits each modulated color light to emit the light in the same direction,
wherein the correction unit includes a first correction unit that is arranged to correspond to light that is reflected by the synthesis unit and a second correction unit that is arranged to correspond to light that transmits through the synthesis unit, the first correction unit being a ⅛ wavelength pate, the second correction unit including at least one ½ wavelength plate.

4. The projection type display apparatus according to claim 1, wherein the correction unit includes at least one polarization plate.

5. The projection type display apparatus according to claim 4,
wherein the synthesis unit reflects or transmits each modulated color light to emit the light in the same direction,
wherein the correction unit includes a first correction unit that is arranged to correspond to light that is reflected by the synthesis unit and a second correction unit that is arranged to correspond to light that transmits through the synthesis unit, the first correction unit being a first polarization plate, the second correction unit including a second polarization plate and a ½ wavelength plate.

6. The projection type display apparatus according to claim 1, wherein the correction unit is provided on each optical path between the plurality of optical path adjustment units and the synthesis unit.

7. The projection type display apparatus according to claim 1, wherein the correction unit is provided on an optical path between the illumination unit and the plurality of optical path adjustment units.

8. The projection type display apparatus according to claim 1, wherein the illumination unit includes a light source and a plurality of optical elements.

9. The projection type display apparatus according to claim 8, wherein the plurality of optical elements include at least a lens array, a polarization conversion element, and a superimposed lens.

10. The projection type display apparatus according to claim 1, wherein the plurality of optical path adjustment units include TIR (Total Internal Reflection) prisms.

11. The projection type display apparatus according to claim 1, wherein the plurality of optical modulation units include Digital Micromirror Devices.

12. The projection type display apparatus according to claim 1, wherein the correction unit includes at least one ⅝ wavelength plate.

13. An image display method comprising:
emitting a plurality of color lights having a predetermined polarization direction;
totally reflecting the plurality of color lights, respectively;
modulating the plurality of totally reflected color lights, respectively;
emitting the plurality of modulated color lights in a same direction to synthesize the plurality of color lights;
projecting the synthesized light,
wherein the image display method further includes, prior to the synthesis of the plurality of modulated color lights, changing a polarization state of each modulated color light to convert the modulated color light into a linearly polarized light; and
wherein the changing changes the polarization state of the entered light to cancel a phase difference between an S-polarized light component and a P-polarized light component of light that is generated when light is totally reflected by the totally reflecting.

* * * * *